(12) United States Patent
Ma et al.

(10) Patent No.: US 11,009,647 B2
(45) Date of Patent: May 18, 2021

(54) BACKLIGHT SOURCE DEVICE, LIGHT GUIDE PLATE AND DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Yihong Ma, Beijing (CN); Jia Chen, Beijing (CN); Lichuan Xiao, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/639,905

(22) PCT Filed: Mar. 25, 2019

(86) PCT No.: PCT/CN2019/079463
§ 371 (c)(1),
(2) Date: Feb. 18, 2020

(87) PCT Pub. No.: WO2019/196635
PCT Pub. Date: Oct. 17, 2019

(65) Prior Publication Data
US 2021/0063628 A1 Mar. 4, 2021

(30) Foreign Application Priority Data

Apr. 12, 2018 (CN) .......................... 201810327414.3

(51) Int. Cl.
*G02B 6/00* (2006.01)
*F21V 8/00* (2006.01)

(52) U.S. Cl.
CPC ......... *G02B 6/0035* (2013.01); *G02B 6/0036* (2013.01); *G02B 6/0038* (2013.01); *G02B 6/0041* (2013.01); *G02B 6/0055* (2013.01)

(58) Field of Classification Search
CPC .. G02B 6/0035; G02B 6/0041; G02B 6/0055; G02B 6/0036; G02B 6/0038; G02B 6/0058; G02B 6/0033; G02B 6/005
See application file for complete search history.

(56) References Cited

U.S. PATENT DOCUMENTS 6,375,336 B1* 4/2002 Suzuki ................ G02B 6/0038
362/603
6,406,158 B1 6/2002 Ohkawa
(Continued)

FOREIGN PATENT DOCUMENTS

CN 1800942 A 7/2006
CN 201425225 Y 3/2010
(Continued)

OTHER PUBLICATIONS

First Office Action, including Search Report, for Chinese Patent Application No. 201810327414.3, dated Jul. 2, 2019, 13 pages.
(Continued)

*Primary Examiner* — Y M. Quach Lee
(74) *Attorney, Agent, or Firm* — Westman, Champlin & Koehler, P.A.

(57) ABSTRACT

The present disclosure relates to a backlight source device, a light guide plate, and a display device. The backlight source device according to an embodiment of the present disclosure includes a light guide plate, a light source and a plastic frame, the light source is provided at an end of the light guide plate and is opposite to a side wall of the light guide plate; the plastic frame is provided at least at an end of the light guide plate away from the light source, wherein a plurality of wedge-shaped recesses are provided at an end
(Continued)

of a light emitting surface of the light guide plate away from the light source.

16 Claims, 3 Drawing Sheets

(56) References Cited

U.S. PATENT DOCUMENTS

| | | | |
|---|---|---|---|
| 7,753,579 B2 | 7/2010 | Kim | |
| 10,534,127 B2 | 1/2020 | Kim et al. | |
| 2002/0039287 A1 | 4/2002 | Ohkawa | |
| 2006/0087867 A1 | 4/2006 | Kim | |
| 2006/0256092 A1* | 11/2006 | Lee | G02B 6/0036 345/173 |
| 2006/0291240 A1* | 12/2006 | Kim | G02B 6/0058 362/600 |
| 2009/0179548 A1* | 7/2009 | Lai | G02B 6/0038 362/606 |
| 2013/0279191 A1 | 10/2013 | Chang | |
| 2016/0097889 A1 | 4/2016 | Kim et al. | |
| 2016/0334624 A1* | 11/2016 | Zhao | G02B 6/0036 |

FOREIGN PATENT DOCUMENTS

| | | |
|---|---|---|
| CN | 102759772 A | 10/2012 |
| CN | 203980038 U | 12/2014 |
| CN | 204879920 U | 12/2015 |
| CN | 105487288 A | 4/2016 |
| CN | 108490531 A | 9/2018 |
| TW | M245423 U | 10/2004 |

OTHER PUBLICATIONS

Second Office Action, including Search Report, for Chinese Patent Application No. 201810327414.3, dated Mar. 11, 2020, 13 pages.

* cited by examiner

# BACKLIGHT SOURCE DEVICE, LIGHT GUIDE PLATE AND DISPLAY DEVICE

CROSS-REFERENCE TO RELATED APPLICATION

This application is a Section 371 National Stage application of International Application No. PCT/CN2019/079463, filed on Mar. 25, 2019, which published as WO 2019/196635 A1, on Oct. 17, 2019, and claims priority to Chinese Patent Application No. 201810327414.3 filed on Apr. 12, 2018 in the National Intellectual Property Administration of China, the disclosures of which are incorporated herein by reference.

TECHNICAL FIELD

The present disclosure relates to a technical field of display screens, and in particular, to a backlight source device, a light guide plate, and a display device.

BACKGROUND

With the progress and development of technology, display modules of display devices such as mobile phones and tablet computers tend to be designed with a high screen ratio, so frames are usually designed to be relatively narrow. The narrow frame of the related technology is usually made of a white plastic frame, and a part of light is diffusely reflected at the white plastic frame, which causes the edge of the light guide plate to form a bright area. In addition, brightness defects such as light leakage may occur at the edge of the light guide plate.

SUMMARY

According to an aspect of the present disclosure, there is provided a backlight source device, comprising: a light guide plate, a light source and a plastic frame, the light source is provided at an end of the light guide plate and is opposite to a side wall of the light guide plate; the plastic frame is provided at least at an end of the light guide plate away from the light source, wherein a plurality of wedge-shaped recesses are provided at an end of a light emitting surface of the light guide plate away from the light source.

In some embodiments, the plurality of wedge-shaped recesses are sequentially distributed in a first direction which is parallel to the light emitting surface of the light guide plate and which is from the end of the light guide plate away from the light source toward an end of the light guide plate close to the light source, and each wedge-shaped recess extends in a second direction perpendicular to the light emitting surface of the light guide plate.

In some embodiments, a projection of each wedge-shaped recess on a plane formed by the first direction and the second direction is in a V-shape, and two adjacent wedge-shaped recesses define a prism-like structure, which has two prism faces.

In some embodiments, each wedge-shaped recess has a first reflection surface close to the light source and a second reflection surface away from the light source, and the first reflection surfaces of the plurality of wedge-shaped recesses are parallel to each other and the second reflection surfaces of the plurality of wedge-shaped recesses are also parallel to each other.

In some embodiments, projections of the first reflection surface and the second reflection surface of each wedge-shaped recess on a plane formed by the first direction and the second direction intersect and form an apex angle, and vertices of the apex angles of the plurality of wedge-shaped recesses are arranged on an apex line, and the apex line is parallel to a total reflection critical line of the second reflection surface.

In some embodiments, the total reflection critical line uses a peak light wave in a spectrum of the light source as a first reference.

In some embodiments, the total reflection critical line uses a yellow light in a spectrum of the light source or a light whose wavelength differs from the wavelength of the yellow light within a certain set range as a second reference.

In some embodiments, the first reflection surface is perpendicular to a part of the light emitting surface of the light guide plate except for the wedge-shaped recesses, and the second reflection surface is inclined with respect to the first reflection surface.

In some embodiments, an angle between the first reflection surface and the second reflection surface is an acute angle.

In some embodiments, maximum depths of the wedge-shaped recesses gradually decrease in the first direction.

In some embodiments, a side of the light guide plate away from the light emitting surface is provided with a reflection plate parallel to the light guide plate, and dots of the light guide plate are arranged in columns, and distances between two adjacent columns of dots gradually decreases in the first direction, projections of the plurality of wedge-shaped recesses on the reflection plate are located between a first column of dots and a second column of the dots in the first direction.

In some embodiments, the projections of the plurality of wedge-shaped recesses on the reflection plate cover projections of the first column of dots and the second column of dots on the reflection plate.

According to another aspect of the present disclosure, there is provided a light guide plate, wherein a plurality of wedge-shaped recesses are formed on the light guide plate, and the plurality of wedge-shaped recesses are formed on an first end of a light emitting surface of the light guide plate.

In some embodiments, the plurality of wedge-shaped recesses are sequentially distributed in a first direction which is parallel to the light emitting surface of the light guide plate and which is from the first end of the light guide plate toward a second end of the light guide plate opposite to the first end, and each wedge-shaped recess extends in a second direction perpendicular to the light emitting surface of the light guide plate.

In some embodiments, the plurality of wedge-shaped recesses have similar shapes, and adjacent two wedge-shaped recesses define a prism-like structure, and the prism-like structure has two prism faces.

In some embodiments, a projection of each wedge-shaped recess on a plane formed by the first direction and the second direction is in a V-shape, and an apex angle of the V-shape is an acute angle.

In some embodiments, maximum depths of the plurality of wedge-shaped recesses gradually decrease in the first direction.

In some embodiments, each wedge-shaped recess has a first reflection surface close to the second end and a second reflection surface close to the first end, and the first reflection surfaces of the plurality of wedge-shaped recesses are parallel to each other and the second reflection surfaces of the plurality of wedge-shaped recesses are also parallel to each other.

In some embodiments, projections of the first reflection surface and the second reflection surface of each wedge-shaped recess on a plane formed by the first direction and a second direction intersect and form an apex angle, and vertices of the apex angles of the plurality of wedge-shaped recesses are arranged on an apex line, and the apex line is parallel to a total reflection critical line of the second reflection surface.

According to another aspect of the present disclosure, there is provided a display device comprising the above backlight source device.

BRIEF DESCRIPTION OF THE DRAWINGS

The above and/or additional aspects and advantages of the present disclosure will become apparent and easily understood from the description of the embodiments in combination with the following drawings, in which.

DETAILED DESCRIPTION OF EMBODIMENTS

Figure 1:
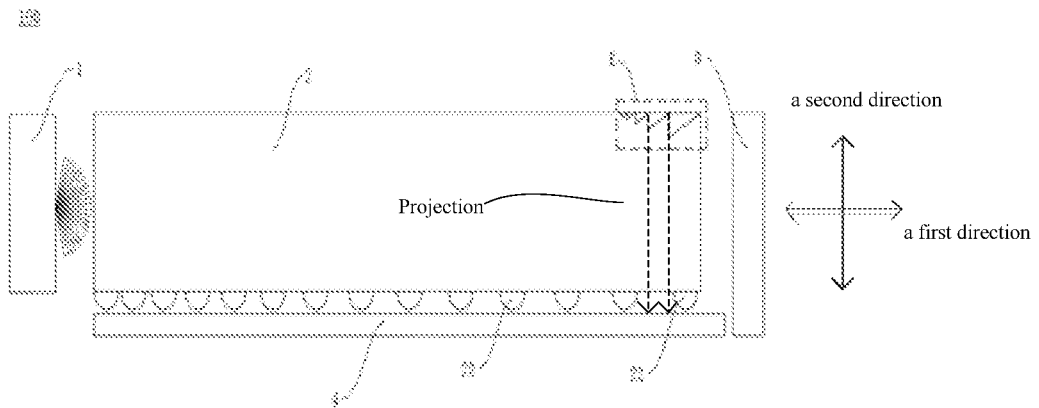
FIG. 1 is a schematic structural diagram of a backlight source device according to an embodiment of the present disclosure.

Hereinafter, embodiments of the present disclosure will be described in detail. Examples of the embodiments are shown in the drawings, wherein the same or similar reference numerals represent the same or similar elements or elements having same or similar functions throughout. The embodiments described below with reference to the drawings are exemplary and are only used to explain the present disclosure, but should not be construed as limiting the present disclosure.

A backlight source device 100 according to an embodiment of the present disclosure is described below with reference to FIGS. 1 to 5.

The backlight source device 100 according to the first aspect of the present disclosure includes a light source 1, a light guide plate 2, and a plastic frame 3.

As shown in FIG. 1, in the embodiment of the present disclosure, the light source 1 is used to emit light to the light guide plate 2. The light source 1 is provided at an end of the light guide plate 2 and the light source 1 is opposite to a side wall of the light guide plate 2. The light emitted from the light source 1 can be transmitted in the light guide plate 2. The light source 1 may be an LED (Light Emitting Diode), a CCFL (Cold Cathode Fluorescent Lamp), etc., which may be selected according to requirements.

Optionally, the light source 1 may be disposed on a side of the light guide plate 2 or may be disposed below the light guide plate 2. The present disclosure is described taking the case where the light source 1 is provided on the side of the light guide plate 2 (see FIG. 1) as an example. It can be understood that the plastic frame 3 in FIG. 1 is only shown as a part of it, so as to facilitate the description to the present disclosure.

Figure 2:
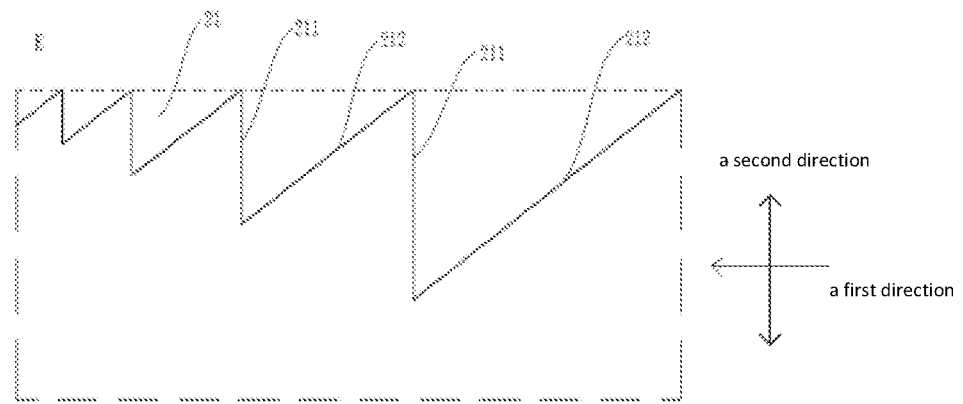
FIG. 2 is a partially enlarged view at E in FIG. 1.

Further, as shown in FIGS. 1 and 2, the plastic frame 3 is disposed at least on an end of the light guide plate 2 away from the light source 1. An end of a light emitting surface, that is, an upper surface, of the light guide plate 2 away from the light source 1 is provided with a plurality of wedge-shaped recesses 21. Here, the wedge-shaped recess refers to a recess that is in a tapered shape from the outer edge to the center of the recess. As shown in FIG. 1, when the light source 1 emits light, the light can be transmitted through the light guide plate 2. A part of the light is emitted from the upper surface of the light guide plate 2 under the action of the light guide plate 2, and a part of the light is emitted on the plastic frame 3. These lights are reflected on a side wall of the plastic frame 3 facing the light source 1 (such a reflection is a diffuse reflection), and the reflected light can be transmitted to the light guide plate 2 again. Among them, a path of a part of the light transmitted to the light guide plate 2 again will pass through the wedge-shaped recesses 21, this part of light may be totally reflected or refracted in the wedge-shaped recesses 21 (refer to FIG. 5). Some of this part of light can be emitted from the upper surface of the light guide plate 2 through multiple refractions or reflections in the light guide plate 2, other of this part of light can be changed in their propagation direction and is emitted toward a bottom surface of the light guide plate 2, so that the light is effectively prevented from leaking out from a gap between the light guide plate 2 and the plastic frame 3, and thus the problems of light leakage and brightness at the edge of the backlight source device 100 may be better prevented.

Specifically, the light diffusely reflected by the plastic frame 3 can be directed toward the wedge-shaped recesses 21, and after the light is refracted by the wedge-shaped recess 21, it can be emitted from the upper surface of the light guide plate 2 or can be incident on another wedge-shaped recess 21 adjacent to the said wedge-shaped recess 21. It can be understood that the propagation path of the light is related to an angle at which the light enters the wedge-shaped recess 21, and different incident angles of the light correspond to different propagation paths.

Figure 5:
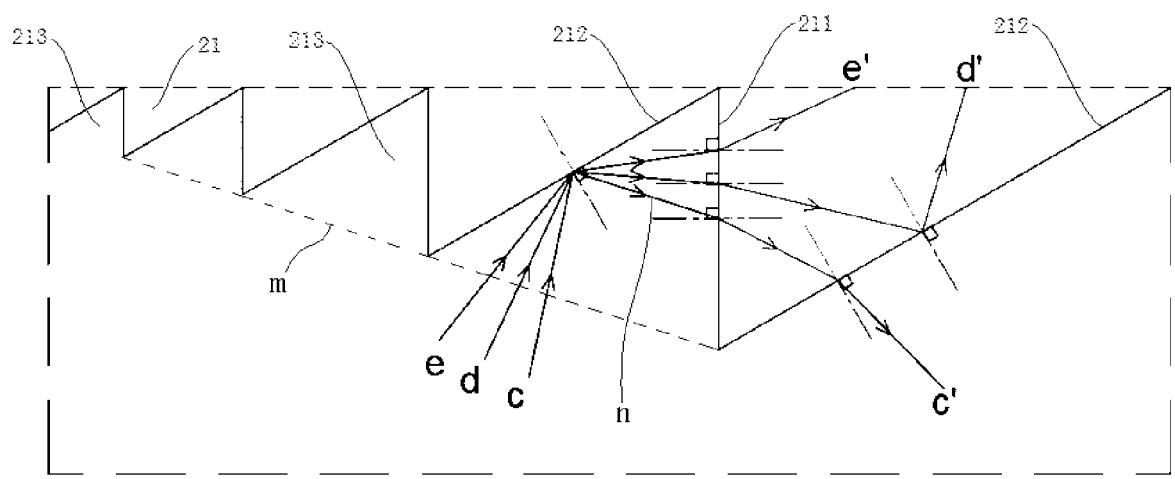
FIG. 5 is a schematic diagram of a plurality of wedge-shaped recesses according to an embodiment of the present disclosure, in which paths of groups of lights on the first reflection surfaces and the second reflection surfaces of the plurality of wedge-shaped recesses are shown.

Further, referring to FIG. 5, when the lights are incident on the wedge-shaped recess 21, the wedge-shaped recess 21 changes the propagation direction of the light so that the light is guided to the upper surface or the lower surface of the light guide plate 2, therefore, the light emitted from the light source 1 and transmitted to the plastic frame 3 is reduced, which can better prevent light leakage and brightness at the edges of the backlight source device 100.

According to the backlight source device 100 according to the embodiment of the present disclosure, by providing a plurality of wedge-shaped recesses 21 on a side of the light guide plate 2 close to the plastic frame 3, the light reflected by the side wall of the plastic frame 3 can be refracted or reflected so that the light is emitted from the upper surface of the light guide plate 2 or is emitted towards the lower surface of the light guide plate 2, so that light leakage from the gap between the light guide plate 2 and the plastic frame 3 can be effectively reduced, and light leakage and brightness at the edge of the backlight source device 100 can be better prevented.

As shown in FIG. 1, in the embodiment of the present disclosure, a direction parallel to the upper surface (or lower surface) of the light guide plate 2 and extending from an end of the light guide plate 2 away from the light source 1 toward an end of the light guide plate 2 close to the light source 1 is a first direction, the plurality of wedge-shaped recesses 21 are sequentially distributed in the first direction and each wedge-shaped recess 21 extends in a second direction, which is perpendicular to the upper surface of the light guide plate, so that the plurality of wedge-shaped recesses 21 can be arranged in a zigzag shape, which also facilitates cooperation among the plurality of wedge-shaped recesses 21, so as to better interfere with the propagation direction of light.

It can be understood that such an arrangement of the plurality of wedge-shaped recesses 21 can better interfere with the propagation direction of the light. After the light is incident on one of the wedge-shaped recesses 21, the light is reflected or refracted on a surface of the wedge-shaped recesses 21, and then can be incident on another wedge-shaped recess 21. The arrangement of the plurality of wedge-shaped recesses 21 has more comprehensive interference with light, and the structure of the wedge-shaped recesses 21 are simple, so that problems such as light leakage at the edge of the backlight device 100 can be better prevented.

As shown in FIG. 1, in the embodiment of the present disclosure, each wedge-shaped recess 21 is in a V-shape, and two adjacent wedge-shaped recesses 21 define a prism-like structure 213, and the prism-like structure 213 has two prism faces. Among them, light can be reflected or refracted on two prism faces. It should be noted that a projection of the wedge-shaped recess 21 in FIG. 1 on a plane formed by the first direction and the second direction is a bottom surface of a prism-like shape. The wedge-shaped recesses 21 have a simple structure and facilitate the faces reflecting or refracting light, so that the wedge-shaped recess 21 has a better guiding effect on light.

The light guide plate 2 can be made of acrylic (specially treated organic glass) or PC plate (polycarbonate hollow plate), etc., and the shape of the light guide plate 2 can be processed according to the size requirements of the design. The wedge-shaped recesses 21 have a simple structure, which is convenient for the production of the light guide plate 2.

As shown in FIG. 2, in the embodiment of the present disclosure, each wedge-shaped recess 21 has a first reflection surface 211 close to the light source 1 and a second reflection surface 212 away from the light source 1. The reflection surfaces 211 of the plurality of wedge-shaped recesses are parallel to each other, and the second reflection surfaces 212 of the plurality of wedge-shaped recesses 21 are also parallel to each other. The light can be refracted or reflected on the first reflection surfaces 211 and the second reflection surfaces 212, so that the propagation direction of the light can be interfered by cooperation of the first reflection surfaces 211 and the second reflection surfaces 212 of the plurality of wedge-shaped recesses 21.

Figure 4:
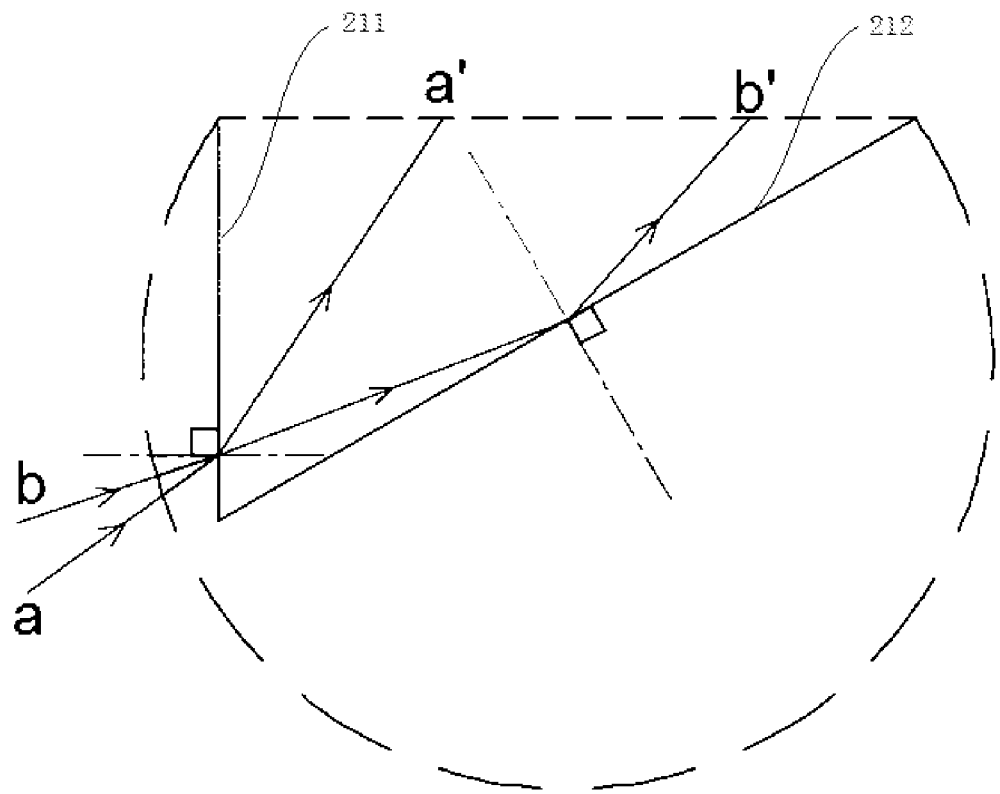
FIG. 4 is a schematic diagram of a wedge-shaped recess according to an embodiment of the present disclosure, in which paths of groups of lights on a first reflection surface and a second reflection surface of the wedge-shaped recess are shown.

As shown in FIG. 4, in a specific embodiment of the present disclosure, light a and light b are incident on the first reflection surface 211 of a wedge-shaped recess 21, and the light a and the light b are refracted at the first reflection surface 211, and is emitted from the first reflection surface 211. The light a is propagated toward the upper surface of the light guide plate 2 and the light b is refracted and then is emitted toward the second reflection surface 212, and the light b is refracted and then is reflected on the second reflection surface 212; the reflected light b is emitted toward the upper surface of the light guide plate 2. When the light is emitted toward the wedge-shaped recess 21, under the action of the first reflection surface 211 and the second reflection surface 212, the light can be emitted in a direction toward the upper surface of the light guide plate 2, thereby interfering with the propagation direction of the light. Furthermore, problems such as light leakage from the edges of the backlight source device 100 can be better prevented.

As shown in FIG. 5, in yet another specific embodiment of the present disclosure, light c, light d, and light e are emitted toward the second reflection surface 212 of a wedge-shaped recess 21, and the light c, the light d, and the light e are reflected by the second reflection surface 212 of the wedge-shaped recess 21, and the light c, the light d, and the light e are reflected and then emitted toward the first reflection surface 211 of another wedge-shaped recess 21 and then all of them are refracted on the first reflection surface 211. The light e is refracted by the first reflection surface 211 and then exits in the direction e; the light d is refracted by the first reflection surface 211 and then is directed toward the second reflection surface 212, and then is reflected by the second reflection surface 212 and exits in the direction d. The light c is refracted by the first reflection surface 211 and then is directed toward the second reflection surface 212, and then refracted by the second reflection surface 212, and is directed toward the bottom surface of the light guide plate 2 in the direction c.

Optionally, as shown in FIG. 2, the shapes of the plurality of wedge-shaped recesses 21 are similar, that is, the shapes of the plurality of wedge-shaped recesses 21 can be enlarged or reduced in proportion, and lights can be emitted from one wedge-shaped recess 21 to another wedge-shaped recess 21, and the plurality of wedge-shaped recesses 21 are arranged in such a similar shape to facilitate cooperation among the plurality of wedge-shaped recesses 21, so that the plurality of wedge-shaped recesses 21 can better interfere with the propagation direction of light.

Figure 3:
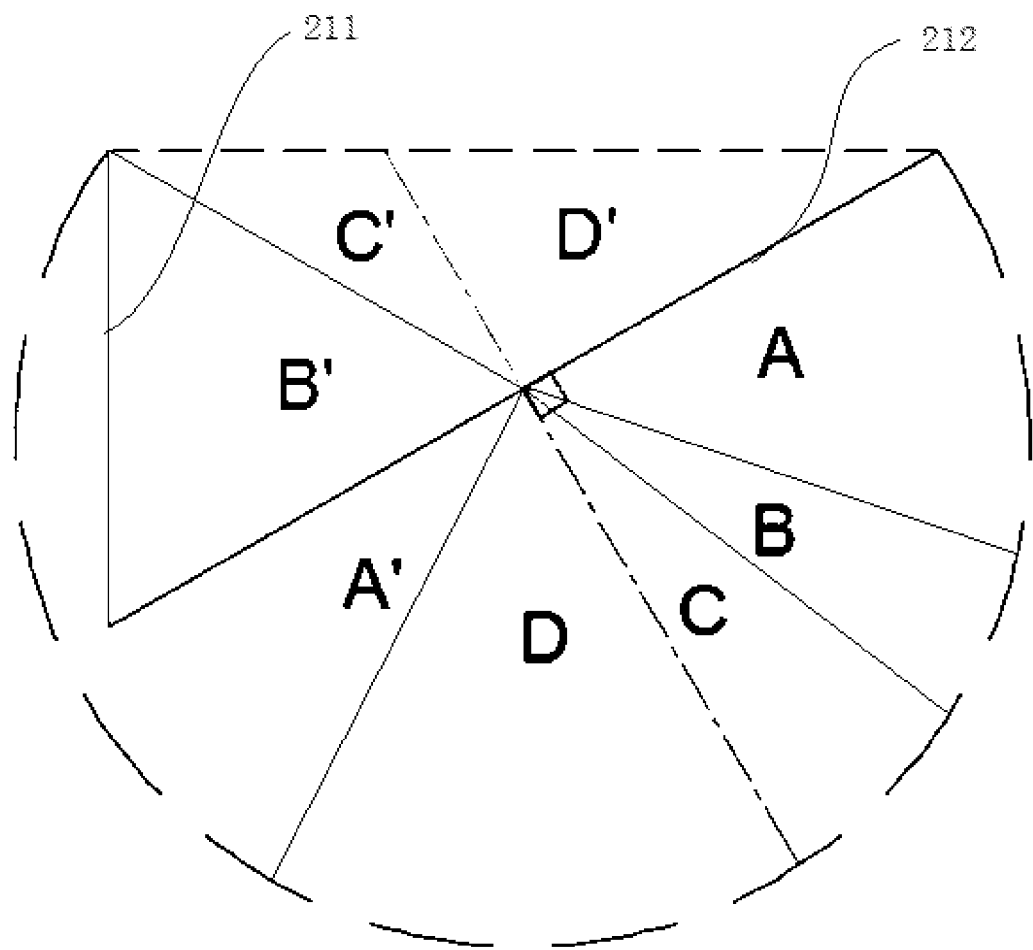
FIG. 3 is a schematic diagram of a wedge-shaped recess according to an embodiment of the present disclosure.

As shown in FIGS. 3 and 5, in some embodiments of the present disclosure, the projections of the first reflection surface 211 and the second reflection surface 212 of each wedge-shaped recess 21 on a plane formed by the first direction and the second direction intersect and form an apex angle, and the vertices of a plurality of apex angles are arranged on a straight line, that is, an apex line m (i.e., a dotted line formed by a plurality of apex lines in FIG. 5). In the plane formed by the first direction and the second direction, the apex angle line m is parallel to a total reflection critical line n of the second reflection surface 212 (as shown in FIG. 5). It can be understood that an angle between the total reflection critical line n and a normal of the second reflection surface 212 is a total reflection critical angle. When an incident angle of an incident light on the second reflection surface 212 is greater than or equal to the total reflection critical angle, the incident light are totally reflected. When the incident angle of the incident light on the second reflection surface 212 is smaller than the total reflection critical angle, a part of the incident light is reflected and a part of the incident light is refracted.

Therefore, it can be ensured that when light is transmitted between the adjacent wedge-shaped recesses 21, after being totally reflected by the second reflection surface 212 of the wedge-shaped recess 21 close to the light source 1, the light can totally enter the first reflection surface 211 of a wedge-shaped recess which is adjacent to the wedge-shaped recesses 21 and away from the light source 1, thereby preventing light from being directly emitted to the bottom of the light guide plate 2 and effectively preventing light leakage.

As shown in FIG. 1 and FIG. 2, in a specific embodiment of the present disclosure, the bottom ends of the plurality of wedge-shaped recesses 21 are connected and located in one same plane, and such a same plane are coplanar with the upper surface of the part of the light guide plate 2 except for the wedge-shaped recesses 21, so that the plurality of wedge-shaped recesses 21 can better interfere with the propagation direction of the light, and further the structure of the light guide plate 2 is simple and easy to manufacture.

As shown in FIG. 3, further, an angle area formed by the total reflection critical line n and the second reflection surface 212 is a total reflection area A. When the angle between the direction of the incident light toward the second reflection surface 212 and the second reflection surface 212 is within the total reflection area A, the light is totally reflected by the second reflection surface 212, that is, the light is directed toward a corresponding total reflection area A.

As shown in FIG. 3, the wedge-shaped recess 21 further includes a refraction area B, a refraction area C, and a refraction area D. When the angle of the incident light entering the second reflection surface 212 is in the refraction area B, the light is emitted from a corresponding refraction area B; when the angle of the incident light entering the second reflection surface 212 is in the refraction area C, the light is emitted from a corresponding refraction area C; when the angle of incident light entering the second reflection surface 212 is in the refraction area D, the light is emitted from a corresponding refraction area D. When the angle between the incident light and the second reflection surface 212 is within the range of the refraction area B, the refraction area C, and the refraction area D, the light is refracted.

It should be noted that the propagation of light is reversible, that is, when the light is emitted from the total reflection area A to the second reflection surface 212, the light is emitted from the total reflection area A; when the light is emitted from the refraction area B to the second reflection surface 212, the light is emitted from the total reflection area B; When the light is emitted from the refracted area C to the second reflection surface 212, the light is emitted from the total reflected area C; when the light is emitted from the refracted area D to the second reflection surface 212, the light is emitted from the total reflection area D.

In some embodiments of the present disclosure, the total reflection critical line n uses the peak light wave in the spectrum of the light source as the first reference, so that the reflection or refraction angle range of the light can be adjusted, and the wedge-shaped recess 21 can better interfere with the propagation direction of light.

In some embodiments of the present disclosure, the total reflection critical line n uses yellow light in the spectrum of the light source as the second reference, so that the reflection or refraction angle range of the light can be better adjusted, and the wedge-shaped recess 21 can better interfere with the propagation direction of light.

Specifically, the second reference may be a light whose wavelength differs from the wavelength of the yellow light within a certain set range, that is, light in the vicinity of the yellow light. Those skilled in the art may set the setting range as required.

As shown in FIG. 2, in some optional embodiments of the present disclosure, the first reflection surface 211 is perpendicular to an upper surface of a part of the light guide plate 2 except for the wedge-shaped recesses 21, so that the reflection or refraction effect of the light on the first reflection surface 211 is simpler, and it is convenient to calculate the direction of the light guided by the wedge-shaped recess 21. In addition, because of the simple structure, it is also convenient for production the light guide plate 2.

As shown in FIG. 2, in a further embodiment of the present disclosure, an angle between the second reflection surface 212 and the first reflection surface 211 is an acute angle, so that the structure of the wedge-shaped recess 21 is simpler, and the arrangement of the acute angle contributes to propagation of the light at the wedge-shaped recesses 21, and the light can be guided more accurately.

As shown in FIGS. 1 and 2, the maximum depths of the plurality of wedge-shaped recesses 21 gradually decrease in the first direction. The maximum depth of each wedge-shaped recess 21 can be understood as the maximum vertical distance of the wedge-shaped recess 21 from the upper surface of the part of the light guide plate 2 except for the wedge-shaped recesses 21. The arrangement in which the maximum depths of the plurality of wedge-shaped recesses 21 is gradually reduced can make the light directed from the side away from the light source 1 toward the wedge-shaped recesses 21 be gradually guided by the wedge-shaped recesses 21, and directed toward the lower surface of the light guide plate 2 or emitted outward along the upper surface of the light guide plate 2 when the light is emitted from the side close to the light source 1 toward the wedge-shaped recesses 21, the light is emitted toward the upper surface of the light guide plate 2 through the light-guided effect of the wedge-shaped recessed portion 21 to the light (see FIG. 4).

As shown in FIG. 1, in the embodiment of the present disclosure, a reflection plate 4 is provided below the light guide plate 2 and in parallel with the light guide plate 2, and dots 22 of the light guide plate 2 are arranged in columns. The distances between two adjacent columns are decreased in the first direction, and a projection of the wedge-shaped recesses 21 on the reflection plate 4 is located between the first column of dots 22 and the second column of dots 22 in the first direction. The projection of the plurality of wedge-shaped recesses 21 on the reflection plate 4 may cover projections of the first column of dots 22 and the second column of dots 22 on the reflection plate 4, so that the light guide plate 2 can better transmit light.

Specifically, when the light is directed to the plurality of dots, the reflected light will be propagated toward various angles, and then the reflection conditions are changed and the light is emitted from the upper surface of the light guide plate 2. By setting dots in a variety of dense and different sizes, the light guide plate 2 can emit light uniformly, and the reflection plate 4 can reflect the light directed to the reflection plate 4 into the light guide plate 2, thereby improving the practical efficiency of light. In the case of equivalent luminous brightness, the luminous efficiency is higher and the power consumption is low.

According to the light guide plate 2 of an embodiment of the second aspect of the present disclosure, a plurality of wedge-shaped recesses 21 are formed on the light emitting surface of the light guide plate 2 (i.e., the upper surface of the light guide plate 2 in the drawing), and the plurality of wedge-shaped recesses 21 are arranged on an end of the light guide plate 2 away from the light source in the first direction. The plurality of wedge-shaped recesses 21 are sequentially distributed in the first direction. Each wedge-shaped recess 21 extends in a second direction perpendicular to the upper surface of the light guide plate 2. The shapes of the plurality of wedge-shaped recesses 21 are similar. Each wedge-shaped recess 21 is in a prism-like shape. When the light is emitted toward the wedge-shaped recess 21, the wedge-shaped recess 21 can guide the light, thereby facilitating the light to be directed to the upper surface of the light guide plate 2 and to be emitted out, or to be directed to the lower surface of the light guide plate 2, so that the light guide plate 2 emits light more uniformly, thereby improving the light guide effect of the light guide plate 2.

As shown in FIG. 1 and FIG. 2, in a further embodiment of the present disclosure, the maximum depths of the plurality of wedge-shaped recesses 21 decreases in sequence in the first direction, and the wedge-shaped recesses 21 may reflect or refract light emitted to the wedge-shaped recesses 21 multiple times, thereby guiding the light better.

A display device according to an embodiment of the third aspect of the present disclosure includes the backlight source device 100 described above. The display device 100 may be a display panel, or a display terminal including the display panel, or a part of the display panel. By providing the backlight source device 100, the display effect of the display device can be improved, thereby improving the user experience.

In the description of the present disclosure, it should be understood that the orientations or positional relationships indicated by the terms "upper", "lower", "top", "bottom", "inside", "outside" and the like are based on the orientations shown in the drawings. Or the positional relationship is only for the convenience of describing the present disclosure and simplifying the description, and does not indicate or imply that the structure or unit referred to must have a specific orientation, structure and operation in a specific orientation, and therefore cannot be understood as a limitation on the present disclosure. In addition, the features defined as "first" and "second" may explicitly or implicitly include one or more of the features, and do not mean that they have a sequential or important secondary relationship with each other. In the description of the present disclosure, unless otherwise stated, "a plurality" means two or more.

In the description of this specification, the description with reference to the terms "one embodiment", "some embodiments", "exemplary embodiments", "examples", "specific examples", or "some examples", etc., means in combination with the implementation of specific features, structures, materials, or characteristics described by examples or examples are included in at least one embodiment or example of the present disclosure. In this specification, the schematic expressions of the above terms do not necessarily refer to the same embodiment or example. Moreover, the particular features, structures, materials, or characteristics described may be combined in any suitable manner in any one or more embodiments or examples.

Although the embodiments of the present disclosure have been shown and described, those of ordinary skill in the art can understand that various changes, modifications, replacements and variations can be made to these embodiments without departing from the principles and spirit of the present disclosure, the scope of the present disclosure is defined by the claims and their equivalents.

What is claimed is:

1. A backlight source device, comprising: a light guide plate, a light source and a plastic frame,
the light source is provided at an end of the light guide plate and is opposite to a side wall of the light guide plate; the plastic frame is provided at least at an end of the light guide plate away from the light source, wherein a plurality of wedge-shaped recesses are provided at an end of a light emitting surface of the light guide plate away from the light source,
wherein the plurality of wedge-shaped recesses are sequentially distributed in a first direction which is parallel to the light emitting surface of the light plate and which is from the end of the light guide plate away from the light source toward an end of the light guide plate close to the light source, and each wedge-shaped recess extends in a second direction perpendicular to the light emitting surface of the light guide plate;
wherein each wedge-shaped recess has a first reflection surface close to the light source and a second reflection surface away from the light source;
wherein projections of the first reflection surface and the second reflection surface of each wedge-shaped recess on a plane formed by the first direction and the second direction intersect and form an apex angle, and vertices of the apex angles of the plurality of wedge-shaped recesses are arranged on an apex line, and the apex line is parallel to a total reflection critical line of the second reflection surface.

2. The backlight source device according to claim 1, wherein a projection of each wedge-shaped recess on a plane formed by the first direction and the second direction is in a V-shape, and two adjacent wedge-shaped recesses define a prism-like structure, which has two prism faces.

3. The backlight source device according to claim 2, wherein the first reflection surfaces of the plurality of wedge-shaped recesses are parallel to each other and the second reflection surfaces of the plurality of wedge-shaped recesses are also parallel to each other.

4. The backlight source device according to claim 3, wherein the first reflection surface is perpendicular to the light emitting surface of the light guide plate, and the second reflection surface is inclined with respect to the first reflection surface.

5. The backlight source device according to claim 3, wherein an angle between the first reflection surface and the second reflection surface is an acute angle.

6. The backlight source device according to claim 1, wherein the total reflection critical line uses a peak light wave in a spectrum of the light source as a first reference.

7. The backlight source device according to claim 1, wherein the total reflection critical line uses a yellow light in a spectrum of the light source or a light whose wavelength differs from the wavelength of the yellow light within a certain set range as a second reference.

8. The backlight source device according to claim 1, wherein maximum depths of the wedge-shaped recesses gradually decrease in the first direction.

9. The backlight source device according to claim 1, wherein a side of the light guide plate away from the light emitting surface is provided with a reflection plate parallel to the light guide plate, and dots of the light guide plate are arranged in columns, and distances between two adjacent columns of the dots gradually decreases in the first direction, a projection of one of wedge-shaped recesses on the reflection plate is located between projections of a first column of dots and a second column of the dots on the reflection plate.

10. The backlight source device according to claim 9, wherein projections of the plurality of wedge-shaped recesses on the reflection plate cover the projections of the first column of dots and the second column of dots on the reflection plate.

11. A display device comprising the backlight source device according to claim 1.

12. A light guide plate, wherein a plurality of wedge-shaped recesses are formed on the light guide plate, and the plurality of wedge-shaped recesses are formed on a first end of a light emitting surface of the light guide plate;
wherein the plurality of wedge-shaped recesses are sequentially distributed in a first direction which is parallel to the light emitting surface of the light guide plate and which is from the first end of the light guide plate toward a second end of the light guide plate opposite to the first end, and each wedge-shaped recess extends in a second direction perpendicular to the light emitting surface of the light guide plate;

wherein each wedge-shaped recess has a first reflection surface close to the second end and a second reflection surface close to the first end;

wherein projections of the first reflection surface and the second reflection surface of each wedge-shaped recess on a plane formed by the first direction and the second direction intersect and for an apex angle, and vertices the apex angles of the plurality of wedge-shaped recesses are arranged on an apex line, and the apex line is parallel to a total reflection critical line of the second reflection surface.

13. The light guide plate according to claim 12, wherein the plurality of wedge-shaped recesses have similar shapes, and adjacent two wedge-shaped recesses define a prism-like structure, and the prism-like structure has two prism faces.

14. The light guide plate according to claim 12, wherein a projection of each wedge-shaped recess on a plane formed by the first direction and the second direction is in a V-shape, and an apex angle of the V-shape is an acute angle.

15. The light guide plate according to claim 12, wherein maximum depths of the plurality of wedge-shaped recesses gradually decrease in the first direction.

16. The light guide plate according to claim 12, wherein the first reflection surfaces of the plurality of wedge-shaped recesses are parallel to each other and the second reflection surfaces of the plurality of wedge-shaped recesses are also parallel to each other.

\* \* \* \* \*